(12) United States Patent
Burns et al.

(10) Patent No.: US 7,175,013 B2
(45) Date of Patent: Feb. 13, 2007

(54) ON-DEMAND COOLING CONTROL FOR POWER TRANSFER SYSTEM

(75) Inventors: Timothy M. Burns, Elbridge, NY (US); Sankar K. Mohan, Jamesville, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 120 days.

(21) Appl. No.: 11/020,002

(22) Filed: Dec. 21, 2004

(65) Prior Publication Data

US 2006/0131122 A1 Jun. 22, 2006

(51) Int. Cl.
*F16D 13/72* (2006.01)
(52) U.S. Cl. ............... 192/70.12; 192/113.34
(58) Field of Classification Search ........... 192/70.12, 192/113.34, 113.35
See application file for complete search history.

(56) References Cited

U.S. PATENT DOCUMENTS

| | | | |
|---|---|---|---|
| 3,749,217 A * | 7/1973 | Bush et al. ............ 192/113.34 |
| 5,704,863 A | 1/1998 | Zalewski et al. | |
| 6,041,903 A | 3/2000 | Burns et al. | |
| 6,145,644 A | 11/2000 | Mohan et al. | |
| 6,315,097 B1 | 11/2001 | Burns | |
| 6,446,774 B2 | 9/2002 | Porter | |
| 6,578,654 B2 | 6/2003 | Porter | |
| 6,745,879 B1 | 6/2004 | Dolan | |
| 6,814,681 B2 | 11/2004 | Porter | |
| 2002/0142879 A1* | 10/2002 | Porter .................. 475/221 |
| 2004/0149505 A1* | 8/2004 | Burns et al. ............ 180/197 |

FOREIGN PATENT DOCUMENTS

JP 01303322 A * 12/1989

* cited by examiner

*Primary Examiner*—Richard M. Lorence
(74) *Attorney, Agent, or Firm*—Harness, Dickey & Pierce, P.L.C.

(57) ABSTRACT

A vehicle includes an engine that generates drive torque and a power transfer device that selectively transfers the drive torque to a driveline. The power transfer device includes an input shaft, an output shaft and a torque biasing system. The torque biasing system has a clutch pack and an actuator that regulates engagement of the clutch pack. An on-demand lubrication system supplies a lubricating fluid flow through the clutch pack based on a control signal generated by a control system. A passively actuated positive displacement pump supplies the lubricating fluid flow through the clutch pack based on a speed differential between the input shaft and the output shaft.

30 Claims, 5 Drawing Sheets

ON-DEMAND COOLING CONTROL FOR POWER TRANSFER SYSTEM

FIELD OF THE INVENTION

The present invention relates to power transfer systems, and more particularly to on-demand cooling control for a power transfer system.

BACKGROUND OF THE INVENTION

Power transfer systems of the type used in motor vehicles such as, for example, four-wheel drive transfer cases, an all-wheel drive power take-off units (PTU) and axle drive modules are commonly equipped with a torque transfer mechanism. Torque transfer mechanisms are operable to regulate the transfer of drive torque from a rotary input component to a rotary output component. Typically, a friction clutch is operably disposed between the input and output components. Engagement of the friction clutch is varied to regulate the amount of drive torque transferred from the input component to the output component.

The degree of clutch engagement is a function of the clutch engagement force that is applied to the friction clutch via a clutch actuator system. Traditional clutch actuator systems include a drive mechanism and a clutch operator mechanism. The clutch operator mechanism converts the force or torque generated by the drive mechanism into the clutch engagement force which is then applied to the friction clutch. The drive mechanism can be passively-actuated or, in the alternative, be a power-driven device which is controlled based on a control signal generated by a control system.

The quality and accuracy of drive torque transfer across the friction clutch is largely based on the frictional interface between the interleaved clutch plates. When partially engaged, the clutch plates slip relative to one another, thereby generating heat. As is known, lubricating fluid is routed to flow through the clutch pack to cool the clutch plates. In a typical clutch engagement cycle, the heat generated due to the frictional work is absorbed by the friction plates as well as via convection due to oil flow through the clutch plates. Excessive heat generation, however, can degrade the lubricating fluid as well as damage the clutch plates.

Additionally, traction control systems require the clutch actuator system to respond to torque commands in a quick and accurate manner. The ability to accurately meet the torque request is largely dependent on the coefficient of friction of the clutch plates. However, it has been demonstrated that this coefficient can change quite rapidly under various loading and/or slip conditions. Specifically, the coefficient tends to fade due to significant temperature increases in the clutch plates which results from insufficient heat removal. It has, however, been demonstrated that improvements in the flow of oil to the friction clutch can improve the stability of the friction coefficient. Specifically, the lube flow rate across the friction clutch has a significant impact on stability of the friction coefficient, particularly during continuous slip conditions. Furthermore, it has been demonstrated that coefficient stability can be maintained over a given time period at various engagement cycles of the friction clutch by varying the lube flow rate. As is known, the heat removal rate is dependent upon lubricating fluid flow rate and condition of the lubricating fluid.

Traditional lubricating/cooling systems include a shaft-driven pump that delivers lubricating fluid to the clutch pack. The shaft-driven pump is typically a unidirectional pump that provides no lubricating fluid flow when the vehicle is operating in a reverse mode, even though torque requests may still occur. For instance, the vehicle may be subjected to backing up on dirt, gravel or a snow-packed hill when torque transfer during four-wheel/all-wheel drive operation is needed. Additionally, the shaft-driven pump is always driven whenever the vehicle is in forward motion. In many cases, however, lubricating fluid is not required until heat is actually generated on the friction clutch components during, for instances, clutch plate slip conditions. Because the shaft-driven pump is always pumping, inefficiencies are realized and fuel economy can be negatively impacted.

Further, most high thermal loading events of the friction clutch occur at lower vehicle speeds. Therefore, the pump capacity of traditional lubricating systems is typically increased for the sake of being able to deliver more lubricating fluid to the friction clutch at low shaft speeds. Increasing pump capacity may further increase the negative impact on fuel economy, as well as creating potential for pump cavitation at higher shaft speeds. Thus, the need exists to develop improved lubrication/cooling systems for use in power transfer devices which overcome the shortcomings of conventional shaft-driven lubrication pumps.

SUMMARY OF THE INVENTION

Accordingly, the present invention is directed to a drivetrain for motor vehicle having a powertrain generating drive torque and a power transfer device for selectively transferring drive torque from the powertrain to a driveline assembly. The power transfer device includes an input member driven by the powertrain, an output member coupled to the driveline assembly, and a torque transfer mechanism. The torque transfer mechanism includes a multi-plate friction clutch and a clutch actuator for regulating engagement of the friction clutch. In addition, the power transfer device also includes a passively-actuated lube pump which functions to selectively supply lubricating fluid to the heat generating components of the friction clutch based on a speed differential between the input member and the output member.

In a related feature, the lube pump is a gerotor-type pump having a first pump element and a second pump element. The first pump element is fixed for rotation with one of the input and output members and the second pump element is fixed for rotation with the other of the input and output members. As such, the pumping action generated by the lube pump is dependent on relative rotation of the input and output members.

In an alternative embodiment, the power transfer device includes an on-demand lubrication system for varying the flow rate of the lubricating fluid supplied to the friction clutch based on a control signal generated by a control system. The on-demand lubrication system comprises a pump and a motor that drives the pump based on the control signal. The pump may be a variable displacement pump. The control signal may be generated based on a slip speed across the input and output components. As an option, the control signal may be generated based on a sump temperature of the lubricating fluid. As a further option, the control signal may be generated based on a temperature differential of the lubricating fluid across the clutch pack.

In other features, the control signal may be generated based on a temperature estimate of the clutch plates. The temperature estimate is determined based on a thermal model of the clutch pack and the operating parameters of the power transfer system.

In accordance with another feature, the control signal operates the pump when the engine is running. Optionally, the control signal operates the pump when the transmission is in a drive gear or a reverse gear. In yet another feature, the control system generates a torque request based on vehicle operating parameters and an operator input such that the control signal is based on the torque request.

In still another alternative embodiment, the power transfer device includes an on-demand lubrication system for supplying lubricating fluid through the clutch pack based on a control signal generated by a control system. Specifically, a passively-actuated positive displacement pump supplies the lubricating fluid flow through the clutch pack based on a speed differential between the input shaft and the output shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
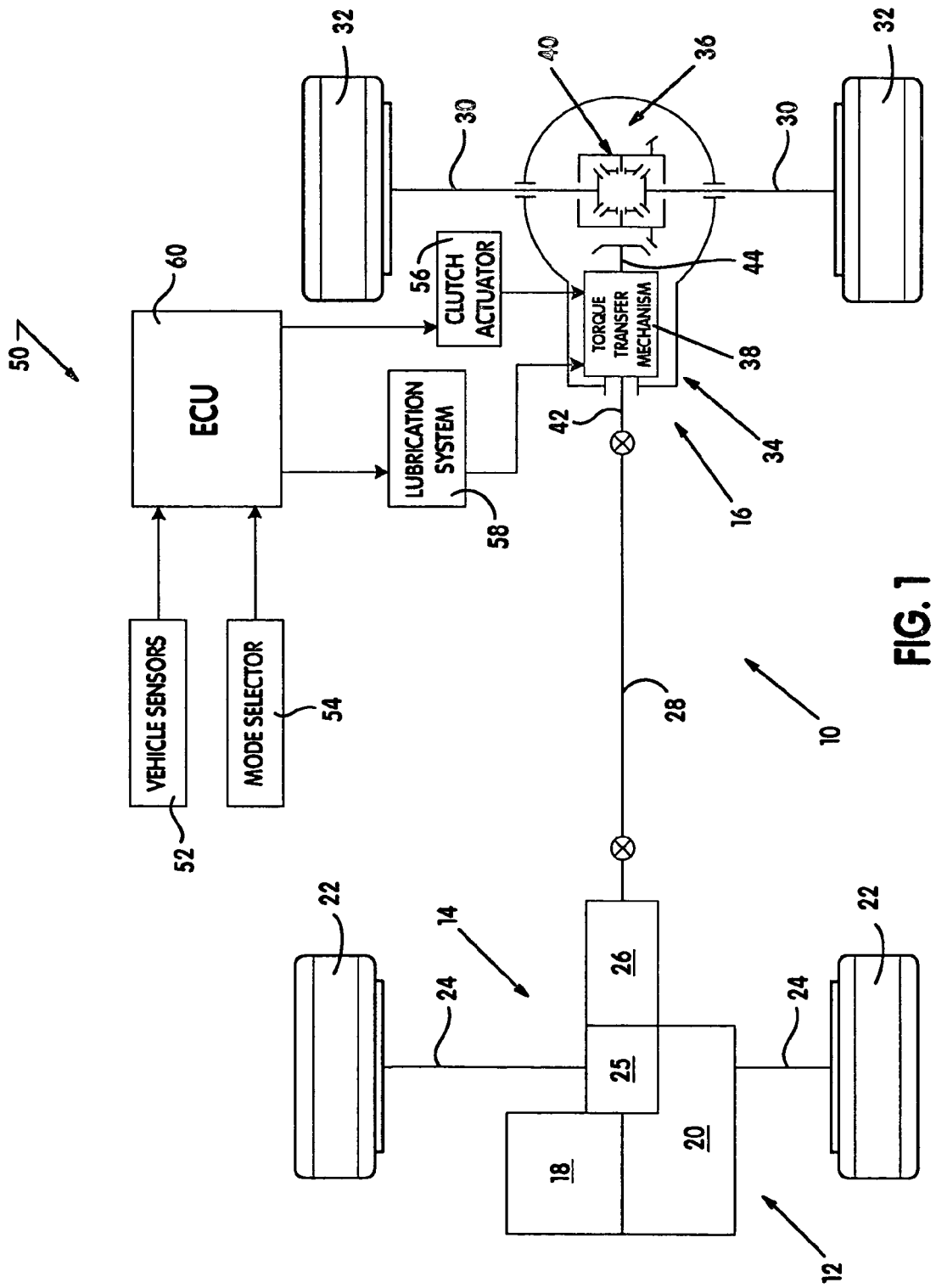
FIG. 1 is a schematic illustration of a motor vehicle including an exemplary power transfer device having a torque transfer mechanism and a lubrication system according to the present invention.

With reference to FIG. 1, a schematic layout of a motor vehicle drivetrain 10 is shown to include a powertrain 12, a first or primary driveline 14 driven by powertrain 12, and a second or secondary driveline 16. Powertrain 12 includes an engine 18 and a multi-speed gearbox 20 arranged to normally provide motive power (i.e., drive torque) to a pair of first wheels 22 associated with primary driveline 14. Primary driveline 14 further includes a pair of axle shafts 24 connecting wheels 22 to a differential unit 25 associated with gearbox 20.

Secondary driveline 16 includes a power take-off unit (PTU) 26 driven by the output of gearbox 20, a propshaft 28 driven by PTU 26, a pair of axle shafts 30 connected to a pair of second wheels 32, and a power transfer device 34 that is operable to selectively transfer drive torque from propshaft 28 to axle shafts 30. Power transfer device 34 is shown to include a drive axle assembly 36 and a torque transfer mechanism 38. Drive axle assembly 36 includes a rear differential unit 40 for transferring drive torque from a pinion shaft 44 to axleshafts 30. Torque transfer mechanism 38 functions to selectively transfer drive torque from propshaft 28 to pinion shaft 44. More specifically, torque transfer mechanism 38 is operably disposed between an input shaft 42 driven by propshaft 28 and pinion shaft 44 which, as noted, drives differential unit 40.

Vehicle drivetrain 10 is further shown to include a control system 50, vehicle sensors 52 and a mode select mechanism 54. Control system 50 regulates actuation of a clutch actuator 56 associated with torque transfer mechanism 38 as well as actuation of an on-demand lubrication system 58 likewise associated with torque transfer mechanism 38. Vehicle sensors 52 are provided to detect various dynamic and operational characteristics of drivetrain 10. Furthermore, mode select mechanism 54 enables the vehicle operator to select one of a plurality of available drive modes. The drive modes may include a two-wheel drive mode, a locked ("part-time") four-wheel drive mode, and an adaptive ("on-demand") four-wheel drive mode. In this regard, torque transfer mechanism 38 can be selectively engaged for transferring drive torque from input shaft 42 to pinion shaft 44 for establishing both of the part-time and on-demand four-wheel drive modes. An electronic control unit (ECU) 60 controls operation of various components associated with control system 50 and, more specifically, controls actuation of lubrication system 58 and clutch actuator 56 associated with torque transfer mechanism 38.

Figure 2:
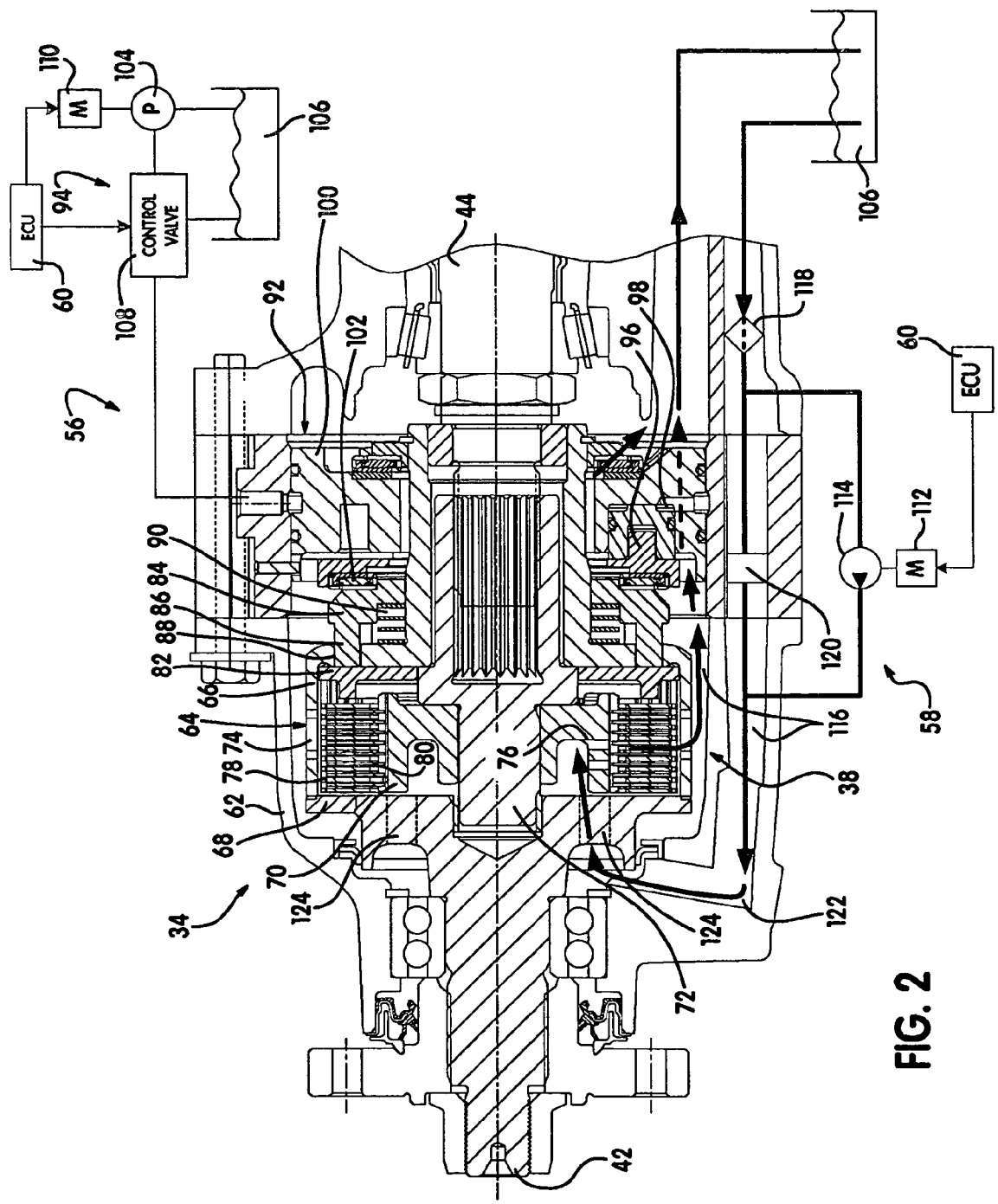
FIG. 2 is a cross-sectional view of a portion of power transfer device including the torque transfer mechanism and a lubrication system having a motor-driven fluid pump according to the present invention.

Referring now to FIG. 2, an exemplary power transfer device 34 will be described in detail in accordance with the present invention. Power transfer device 34 includes a multi-piece housing 62 that encloses torque transfer mechanism 38, input shaft 42 and pinion shaft 44. Torque transfer mechanism 38 generally includes a multi-plate friction clutch 64 and clutch actuator 56. Clutch actuator 56 is operable to generate and apply a clutch engagement force on friction clutch 64 to adaptively regulate the amount of drive transferred to pinion shaft 44. More particularly, control system 50 determines a clutch duty cycle based on a torque request ($T_{REQ}$). Preferably, actuator 56 is regulated based on the clutch duty cycle to variably control the torque transferred through friction clutch 64.

Friction clutch 64 includes a drum 66 fixed for rotation with a flange segment 68 of input shaft 42, and a hub 70 fixed for rotation with pinion shaft 44 via an intermediate coupling shaft 72. Drum 66 includes a plurality of apertures 74 disposed therethrough. Likewise, hub 70 includes a plurality of apertures 76 therethrough. Friction clutch 64 further includes a multi-plate clutch pack having a plurality of first clutch plates 78 that are fixed to drum 66 and interleaved with a plurality of second clutch plates 80 that are fixed to hub 70. An annular pressure plate 82 is disposed within drum 66 and a thrust plate 84 is disposed outside of drum 66. Thrust pins 86 attached to thrust plate 84 extend through apertures 88 in drum 66 and engage pressure plate 82. A return spring 90 is shown to be disposed between an external surface of drum 66 and thrust plate 84 for axially biasing thrust plate 84 away from drum 66.

In general, clutch actuator 56 includes an operator unit 92 for moving thrust plate 84 so as to control the clutch engagement force exerted on clutch pack 64 via apply plate 82, and a power-operated drive mechanism 94. In addition to thrust plate 84, operator unit 92 includes a hydraulically-actuated piston 96 that that is slidably disposed within a piston chamber 98 formed in a valvebody 100 that is non-rotatably mounted within housing 62. A thrust bearing assembly 102 is disposed between thrust plate 84 and piston 96. The bias force of spring 90 acting on thrust plate 84 also induces piston 96 to normally move away from drum 66. Power-operated drive mechanism 94 is operable to generate and control the fluid pressure within piston chamber 98. In particular, pressurized fluid is supplied to piston chamber 96 via a fluid control system shown in FIG. 2 to include a pump 104 that is adapted to receive hydraulic fluid from a sump 106 and transmit pressurized fluid to a control valve 108, and an electric motor 10 driving pump 104. Motor 110 and control valve 108 are controlled by ECU 60 to regulate the fluid pressure within piston chamber 98, thereby controlling sliding movement of piston 96. As is apparent, such movement of piston 96 controls the position of thrust plate 84 which, in turn, controls the magnitude of the clutch engagement force applied by pressure plate 82 on clutch pack 64. Although actuator 56 is described herein as a hydraulic actuator, it is anticipated that other types of power-driven clutch actuators can be implemented to regulate clutch engagement including, but not limited to, ballramp and ballscrew operators driven by electric motors or electromagnetic devices.

In operation, the engagement of friction clutch 64 is manipulated to regulate torque transfer from input shaft 42 to pinion shaft 44. More particularly, in a released mode, no engagement force is imparted on friction clutch 64 and first and second clutch plates 78 and 80 are permitted to slip relative to one another. As a result, there is no torque transfer from input shaft 42 to pinion shaft 44. In a fully engaged mode, a large engagement force is imparted on friction clutch 64 and there is no slip between first and second clutch plates 78 and 80. As a result, there is a complete torque transfer from input shaft 42 to pinion shaft 44. The engagement force can be regulated to operate friction clutch 64 in a partially engaged mode where the torque transfer can vary between 0% and 100%. More specifically, a sufficient engagement force imparted on friction clutch 64 will allow some slip between interleaved clutch plates 78 and 80. However, the amount of slip is controlled to provide torque transfer from input shaft 42 to pinion shaft 44.

During periods of slip, heat is generated as a result of the frictional interface between interleaved clutch plates 78 and 80. Lubrication system 58 operates to lubricate the clutch pack and remove the heat generated, thus preventing damage to the components of friction clutch 64, degradation of the hydraulic fluid quality, and improving the torque transfer characteristics as a result of a reduction in the fading of the coefficient of friction between interleaved clutch plates 78 and 80. In this manner, clutch pack durability and torque transfer control accuracy are improved. Thus, lubrication system 58 is selectively implemented to provide clutch pack lubrication when conditions so require.

Lubrication system 58 of FIG. 2 includes a motor 112 that drives a pump 114. Although pump 114 is preferably a variable displacement pump, it is appreciated that pump 114 can be a fixed displacement pump or any other type of suitable pump known in the art. Motor 112 receives control signals from ECU 60 and drives pump 114 to supply lubricating fluid to clutch pack 64 via a circuitous flow pathway 116 defined by various flow paths within power transfer device 34. More particularly, lubricating fluid is drawn from sump 106 through a filter 118 and a one-way check valve 120 and is delivered to a lubricant passage 122.

The lubricating fluid flows through lubrication apertures 124 formed flange 68 of input shaft 42 and flows through and around the interleaved clutch plates. Preferably, the fluid flows through apertures 76 in hub 70 and between the interleaved clutch plates before it is discharged through exhaust apertures 74 in drum 66 and through a return flow path in actuator 56 back to sump 106. Motor 112 can be driven by control system 50 based on a desired control strategy, as discussed in further detail below.

It is also anticipated that lubrication system 58 can be configured to provide lubricant fluid flow in a reverse direction to that described above. More particularly, lubrication system 58 can be configured such that motor driven pump 104 pumps fluid through exhaust apertures 74 in drum 66, around the clutch pack, out of apertures 76 in hub 70, lubrication apertures 124 and lubricant passage 122 back to sump 106.

The on-demand, motor-driven lubrication system 58 enables sufficient lubricating fluid flow to remove heat and maintain a stable coefficient of friction in friction clutch pack 64. In addition, motor-driven lubrication system 58 operates independently of input/pinion shaft rotation. As a result, in the event of clutch slip while the vehicle is backing up a hill, for example, lubricating fluid is still delivered to friction clutch 64, unlike the unidirectional positive displacement pumps implemented in traditional power transfer devices. Further, motor-driven lubrication system 58 induces lubricant fluid flow only when demanded, based on a preferred strategy for a given application. In this manner, overall efficiency of driveline 10 is improved as compared to a traditional shaft driven pump arrangement.

Motor-driven lubrication system 58 can be sized to provide sufficient lubricating fluid flow for the most aggressive duty cycle that friction clutch 64 may experience based on normal operating modes for performance and handling. In addition, cavitation is avoided because pump speeds are a function of the motor speed as opposed to input shaft speed. Further advantages are realized in that, even if slip speeds are kept to a minimum after an extreme heat generating condition, continued cooling of friction clutch 64 is provided. Motor-driven lubrication system 58 can deliver a substantial amount of fluid flow to provide shorter cool-down times, improve the life of the clutch pack components and the life and quality of the lubricating fluid.

Figure 3:
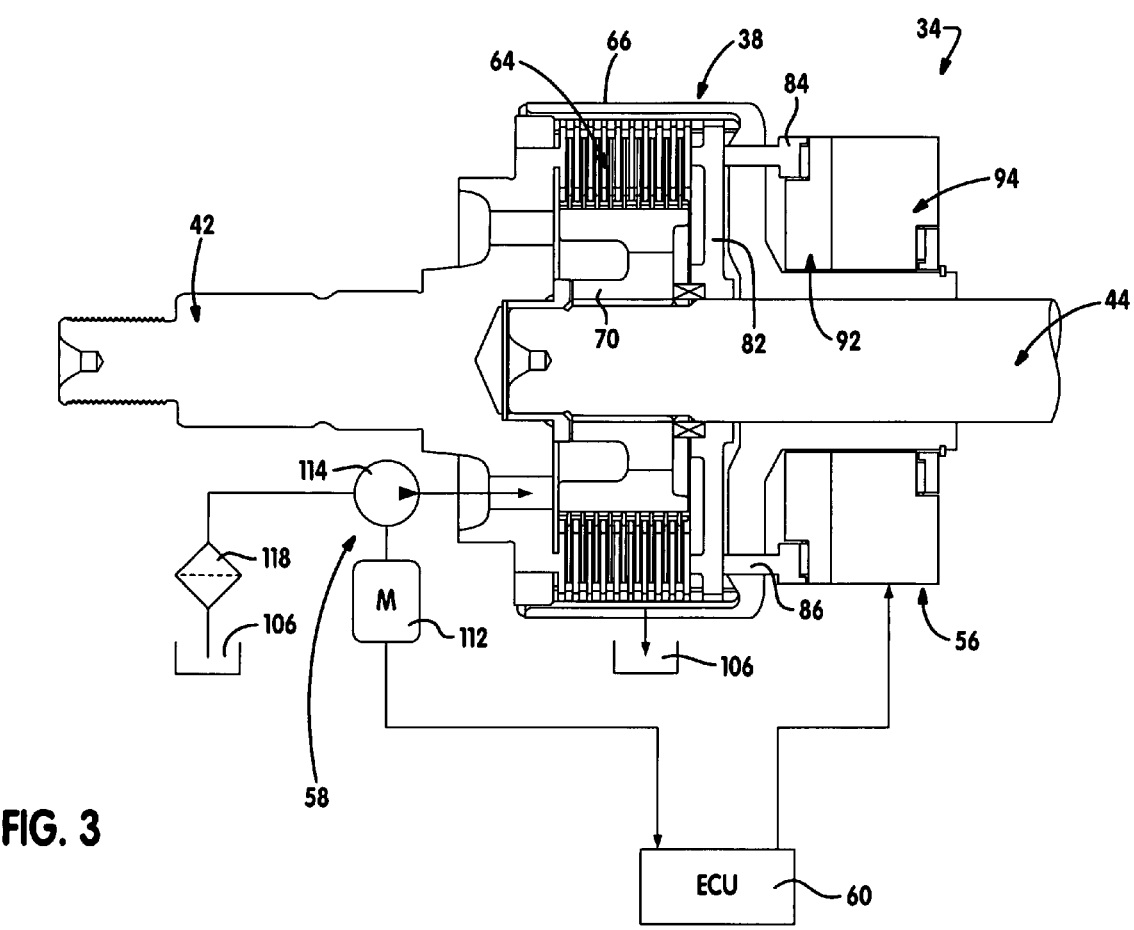
FIG. 3 is a modified revision of the power transfer device shown in FIG. 2.

FIG. 3 is a view showing power transfer device 34 of FIG. 2 in a simplified arrangement to illustrate the ability to utilize various clutch actuators in association with torque transfer mechanism 38. In particular, it is contemplated that operator unit 92 is schematically shown to be representative of such devices as ballramps, ballscrews, rotary cams, rollers and the like that are capable of causing axial translational movement of pressure plate 82. Likewise, power-operated drive unit 94 represents such devices as, for example, motors, electromagnetic solenoids, and eddy current devices capable of receiving control signals from ECU 60 and actuating operator unit 92 in response thereto. Under any scenario, the independent control of lubrication system 58 is advantageous over all known conventional arrangements.

Figure 4:
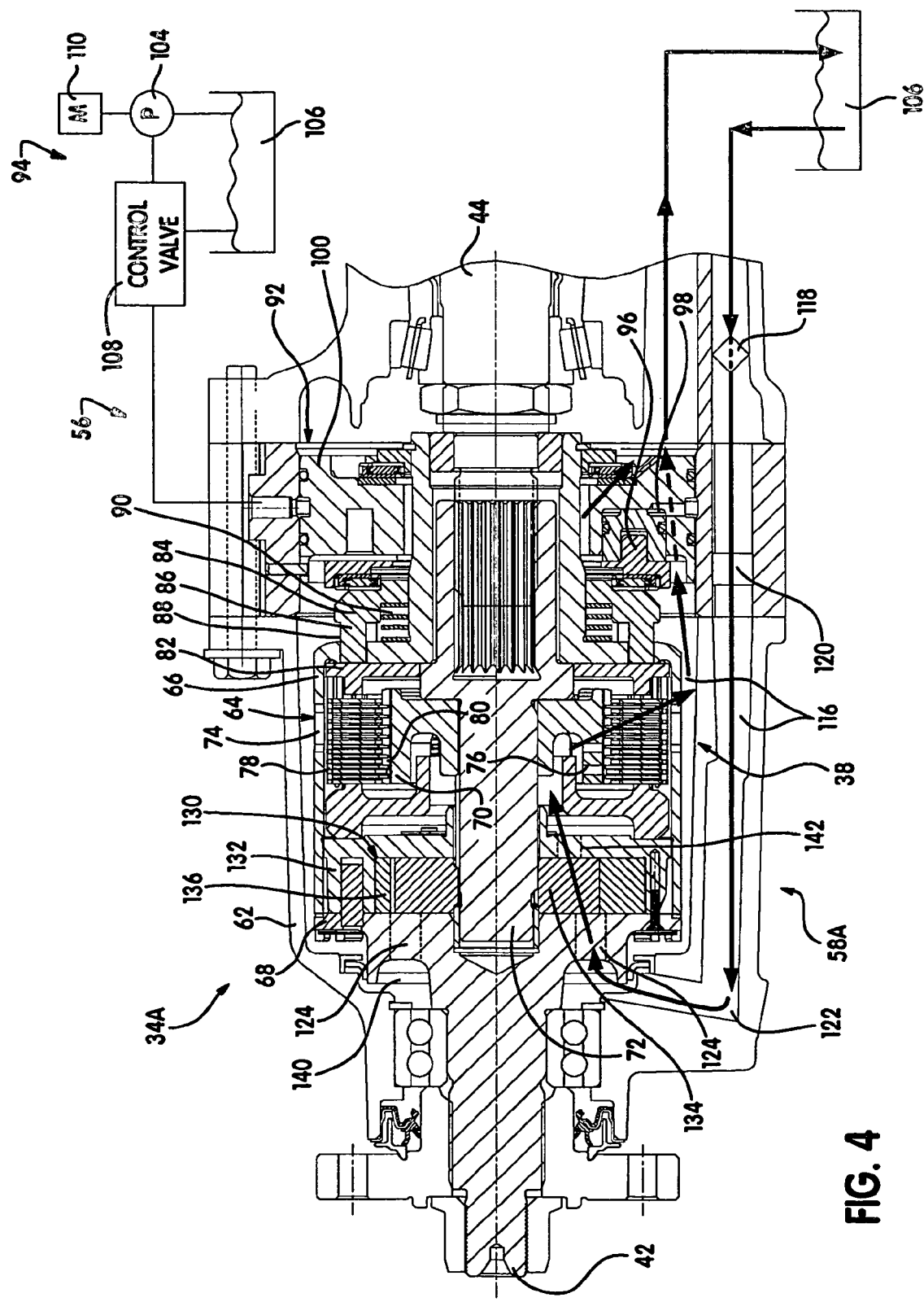
FIG. 4 is a cross-sectional view of a portion of an alternative power transfer device including a torque transfer mechanism and a lubrication system having a gerotor-type fluid pump according to the present invention.

Referring now to FIG. 4, an alternative power transfer device 34A is shown to include an alternative lubricating system 58A. Lubricating system 58A includes a gerotor-type passively-actuated, bidirectional, positive displacement pump 130 incorporated between input shaft 42 and pinion shaft 44. More particularly, lubricating system 58A includes a pump housing 132 and hypocycloidal inner and outer gear elements 134 and 136, respectively. Pump housing 132 is disposed within and is fixed for rotation with input flange 68 and drum 66. Outer gear element 136 is disposed within an eccentric recess formed in pump housing 132. Inner gear element 134 is fixed for rotation with coupling shaft 72. In this manner, inner gear element 134 is fixed for rotation with pinion shaft 44. Thus, the pumping action is dependent on relative rotation between input shaft 42 and pinion shaft 44.

During periods of 100% torque transfer between input shaft 42 and pinion shaft 44 (i.e., no clutch slip), there is no relative rotation between inner and outer gear elements 134 and 136. As a result, gerotor-type pump 130 does not pump lubricating fluid into friction clutch 64. However, during periods of relative rotation between input shaft 42 and pinion shaft 44 (i.e., clutch slip), there is relative rotation between inner and outer gear elements 134 and 136 and gerotor-type pump 130 pumps lubricating fluid through flow path 116 into and out of friction clutch 64. More particularly, lubricating fluid is drawn from sump 106 through filter 118 and is delivered to lubricating port 122. The lubricating fluid flows through lubrication apertures 124 in input shaft 42 through directional check valves 140 and into the low pressure suction inlet of gerotor-type pump 130. The lubricating fluid is then discharged from the higher pressure side of pump 130 through ports 142 in housing 132 and flows through apertures 76 in hub 70 and through the clutch pack. The lubricating fluid flows out of the friction clutch pack through exhaust apertures 74 in drum 66 and through actuator 56 back to sump 106.

Passively-actuated, gerotor-type pump 130 enables sufficient lubricant fluid flow during extreme slip conditions. Because the gerotor-type pump is a bidirectional pump, lubricant fluid flow is induced regardless of whether the vehicle is in drive or reverse. As a result, lubricant fluid flow is provided during maneuvers such as backing the vehicle up an incline. Additionally, lubricant fluid flow is only induced when there is a speed differential across the clutch pack (i.e., slip). As a result, energy is conserved as compared to traditional lubrication systems because the pumping action is not continuous. This improves overall system efficiency and fuel economy. The passively actuated lubrication system 58A can be properly sized to provide sufficient lubricating fluid flow with relative to the maximum heat generation condition that the vehicle may experience. Additionally, the passively actuated lubrication system 58A is thermally self-regulating relative to slip speed when friction clutch 64 is operating in a torque limiting mode. As the slip speed across the clutch pack increases, so does the volume of lubricating fluid flowing through friction clutch 64. In other words, as the rate of heat generation increases, so does the rate of cooling.

Figure 5:
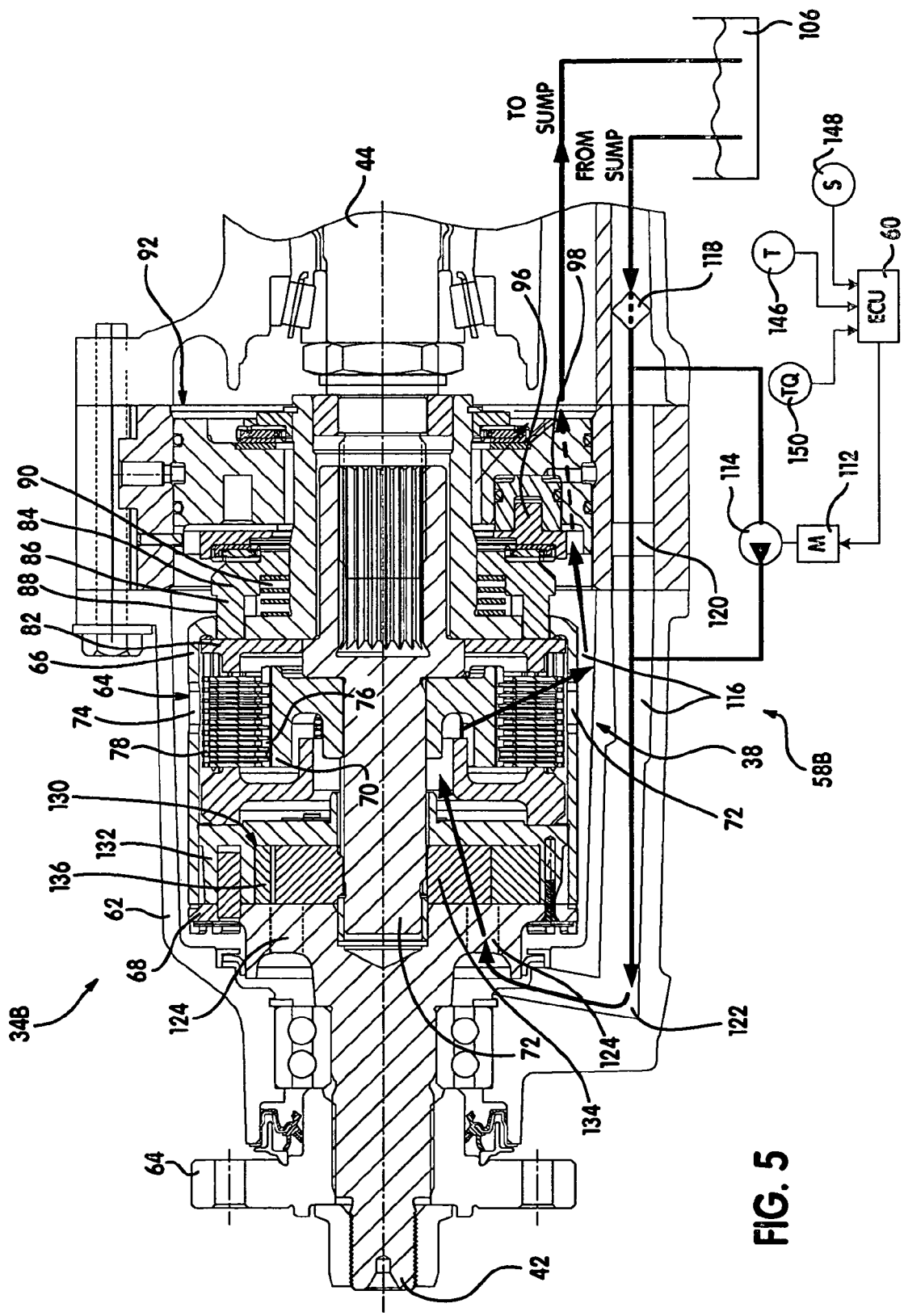
FIG. 5 is a cross-sectional view of another alternative power transfer device including a torque transfer mechanism and a lubrication system having a motor-driven fluid pump and a gerotor-type fluid pump according to the present invention.

Referring now to FIG. 5, another alternative exemplary power transfer device 34B is shown to include another alternative lubrication system 58B. Lubrication system 58B incorporates both motor driven pump 114 and gerotor-type pump 130, each of which is described in detail above. Motor driven pump 114 is actively operated based on a preferred control strategy, as described in further detail below and gerotor-type pump 130 is passively operated based on the relative speeds of input shaft 42 and pinion shaft 44, as described in detail above. Lubrication system 58B provides the advantages of both lubrication system 58 and lubrication system 58A, which are discussed in detail above. It is anticipated that motor driven pump 114 and gerotor-type pump 130 can be operated alone or in concert to lubricate friction clutch 64.

As discussed previously, gerotor-type pump 130 is passively operated based on the relative speeds between input shaft 42 and pinion shaft 44 (i.e., slip across the clutch pack).

Motor driven pump 114 is actively operated (i.e., on-demand) based on a preferred control strategy for a given application. The present invention provides multiple control strategies for lubricating friction clutch 64 using motor driven pump 114. In accordance with one control strategy, motor driven pump 114 can be operable whenever the vehicle is on and engine 18 is running. In accordance with another control strategy, motor driven pump 114 is operable whenever transmission 20 is in drive or reverse. In accordance with another control strategy, a sump temperature sensor 146 is included in vehicle sensors 52. Sump temperature sensor 146 generates a signal to ECU 60 indicating the temperature of the lubricating fluid in sump 106. The sump temperature ($T_{SUMP}$) is compared to a predefined temperature range. If the sump temperature is outside of the temperature range, motor driven pump 114 is activated to induce fluid flow through friction clutch 64. As a result, this control strategy can be used to heat the lubricating fluid when operating in extreme cold conditions as well as to cool the clutch pack.

Another control strategy modulates the output of pump 114 based on the speed of either input shaft 42 or output shaft 44. Vehicle sensors 52 include speed sensors 148 which detect a rotational speed of either or both of input shaft 42 and pinion shaft 44 and generate speed signals based thereon. The speed signals from the speed sensors are processed by control system 50 to determine the shaft speed. As the shaft speed increases, the volume of lubricating fluid flow correspondingly increases. Similarly, the pump output can be modulated based on slip speed across the clutch pack.

Another control strategy modulates the pump output based on $T_{REQ}$. As $T_{REQ}$ increases, the volume of lubricating fluid flow correspondingly increases. Alternatively, the pump output can be modulated based on the clutch duty-cycle which is determined based on $T_{REQ}$, as discussed in detail above. Similarly, the pump output can be modulated based on the actual torque transferred through the driveline. In this case, an actual torque ($T_{ACT}$) is determined from a torque sensor 150 or is estimated by control system 50 based on vehicle operating parameters. As $T_{ACT}$ increases, the volume of lubricating fluid flow correspondingly increases.

Still another control strategy modulates pump output based on a temperature differential ($\Delta T$) of the lubricating fluid. More specifically, an inlet temperature sensor of vehicle sensors 52 generates a signal indicating an inlet temperature ($T_{IN}$) of the lubricating fluid into entering clutch pack. An outlet temperature sensor of vehicle sensors 52 generates a signal indicating an outlet temperature ($T_{OUT}$) of the lubricating fluid discharged from the clutch pack. $\Delta T$ is determined as the difference between $T_{IN}$ and $T_{OUT}$. $\Delta T$ is compared to a threshold differential. If $\Delta T$ is greater than the threshold differential, the pump output is increased to reduce $\Delta T$. If $\Delta T$ is less than the threshold differential, the pump output is decreased.

Yet another control strategy modulates pump output based on a thermal model of torque transfer mechanism 38. More specifically, control system 50 processes vehicle operating parameters including, but not limited to, clutch torque, clutch slip speed, vehicle speed, ambient temperature, $T_{OUT}$ and $T_{SUMP}$ to determine an estimated aggregate temperature of the clutch pack ($T_{CLUTCH}$). It is anticipated that each of the operating parameters can be either directly measured or can be determined based on other operating parameters. The pump output is modulated based on $T_{CLUTCH}$ to maintain $T_{CLUTCH}$ within an acceptable range.

Multiple embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transfer system, comprising:
  a control system;
  a torque biasing system including a clutch pack and an actuator that regulates engagement of said clutch pack; and
  an on-demand lubrication system that supplies a lubricating fluid flow through said clutch pack based on a control signal generated by the control system and based on a slip speed across said clutch pack.

2. The power transfer system of claim 1, wherein said on-demand lubrication system comprises:
  a pump; and
  a motor that drives said pump based on said control signal.

3. The power transfer system of claim 2, wherein said pump is a variable displacement pump.

4. A power transfer system, comprising:
  a control system;
  a torque biasing system including a clutch pack and an actuator that regulates engagement of said clutch pack; and
  an on-demand lubrication system that supplies a lubricating fluid flow through said clutch pack based on a control signal generated by the control system and based on a sump temperature of said lubricating fluid.

5. A power transfer system, comprising:
  a control system;
  a torque biasing system including a clutch pack and an actuator that regulates engagement of said clutch pack; and
  an on-demand lubrication system that supplies a lubricating fluid flow through said clutch pack based on a control signal generated by the control system and based on a temperature differential of said lubricating fluid across said clutch pack.

6. A power transfer system, comprising:
  a control system;
  a torque biasing system including a clutch pack and an actuator that regulates engagement of said clutch pack; and
  an on-demand lubrication system that supplies a lubricating fluid flow through said clutch pack based on a control signal generated by the control system and based on a temperature estimate of said clutch pack.

7. The power transfer system of claim 6, wherein said temperature estimate is determined based on a thermal model of said clutch pack and operating parameters of said power transfer system.

8. A power transfer system for selectively transferring torque between an input shaft and an output shaft, comprising:
  a torque biasing system including a clutch pack and an actuator that regulates engagement of said clutch pack;
  a passively actuated positive displacement pump that supplies a lubricating fluid flow through said clutch pack based on a speed differential between said input shaft and said output shaft; and
  an on-demand lubrication system that supplies said lubricating fluid flow through said clutch pack based on a control signal generated by a control system.

9. The power transfer system of claim 8, wherein said pump is a gerotor-type pump that includes an outer gear element and an inner gear element.

10. The power transfer system of claim 9, wherein said outer gear element is fixed for rotation with one of said input shaft and said output shaft and said inner gear element is fixed for rotation with the other of said input shaft and said output shaft.

11. The power transfer system of claim 8, wherein said on-demand lubrication system comprises:
  a pump; and
  a motor that drives said pump based on said control signal.

12. The power transfer system of claim 11, wherein said on-demand lubrication system pump is a variable displacement pump.

13. The power transfer system of claim 8, wherein said control signal is generated based on a slip speed across said clutch pack.

14. The power transfer system of claim 8, wherein said control signal is generated based on a sump temperature of said lubricating fluid.

15. The power transfer system of claim 8, wherein said control signal is generated based on a temperature differential of said lubricating fluid across said clutch pack.

16. The power transfer system of claim 8, wherein said control signal is generated based on a temperature estimate of said clutch pack.

17. The power transfer system of claim 16, wherein said temperature estimate is determined based on a thermal model of said clutch pack and operating parameters of said power transfer system.

18. A vehicle, comprising:
  an engine that generates drive torque; and
  a power transfer device that selectively transfers drive torque to a driveline, comprising:
    an input shaft;
    an output shaft;
    a torque biasing system including a clutch pack and an actuator that regulates engagement of said clutch pack;
    a passively actuated positive displacement pump that supplies a lubricating fluid flow through said clutch pack based on a speed differential between said input shaft and said output shaft; and
  an on-demand lubrication system that supplies said lubricating fluid flow through said clutch pack based on a control signal generated by a control system.

19. The vehicle of claim 18, wherein said pump is a gerotor-type pump that includes an outer gear element and an inner gear element.

20. The vehicle of claim 19, wherein said outer gear element is fixed for rotation with one of said input shaft and said output shaft and said inner gear element is fixed for rotation with the other of said input shaft and said output shaft.

21. The vehicle of claim 18, wherein said on-demand lubrication system comprises:
a pump; and
a motor that drives said pump based on said control signal.

22. The vehicle of claim 21, wherein said on-demand lubrication system pump is a variable displacement pump.

23. The vehicle of claim 18, wherein said control signal is generated based on a slip speed across said clutch pack.

24. The vehicle of claim 18, wherein said control signal is generated based on a sump temperature of said lubricating fluid.

25. The vehicle of claim 18, wherein said control signal is generated based on a temperature differential of said lubricating fluid across said clutch pack.

26. The vehicle of claim 18, wherein said control signal is generated based on a temperature estimate of said clutch pack.

27. The vehicle of claim 26, wherein said temperature estimate is determined based on a thermal model of said clutch pack and operating parameters of said power transfer system.

28. The vehicle of claim 18, wherein said control signal operates said pump when said engine is running.

29. The vehicle of claim 18, further comprising a transmission, wherein said control signal operates said pump when said transmission is in one of a drive gear and a reverse gear.

30. The vehicle of claim 18, wherein said control system generates a torque request based on vehicle operating parameters and an operator input and said control signal is based on said torque request.

* * * * *